Nov. 6, 1951     I. NEUSTADTER     2,573,805

MACHINE FOR MAKING DENTURES

Filed Nov. 16, 1949     2 SHEETS—SHEET 1

INVENTOR
Irving Neustadter
BY
Isam E. C. Kinigsberg
ATTORNEY

Nov. 6, 1951     I. NEUSTADTER     2,573,805
MACHINE FOR MAKING DENTURES
Filed Nov. 16, 1949     2 SHEETS—SHEET 2
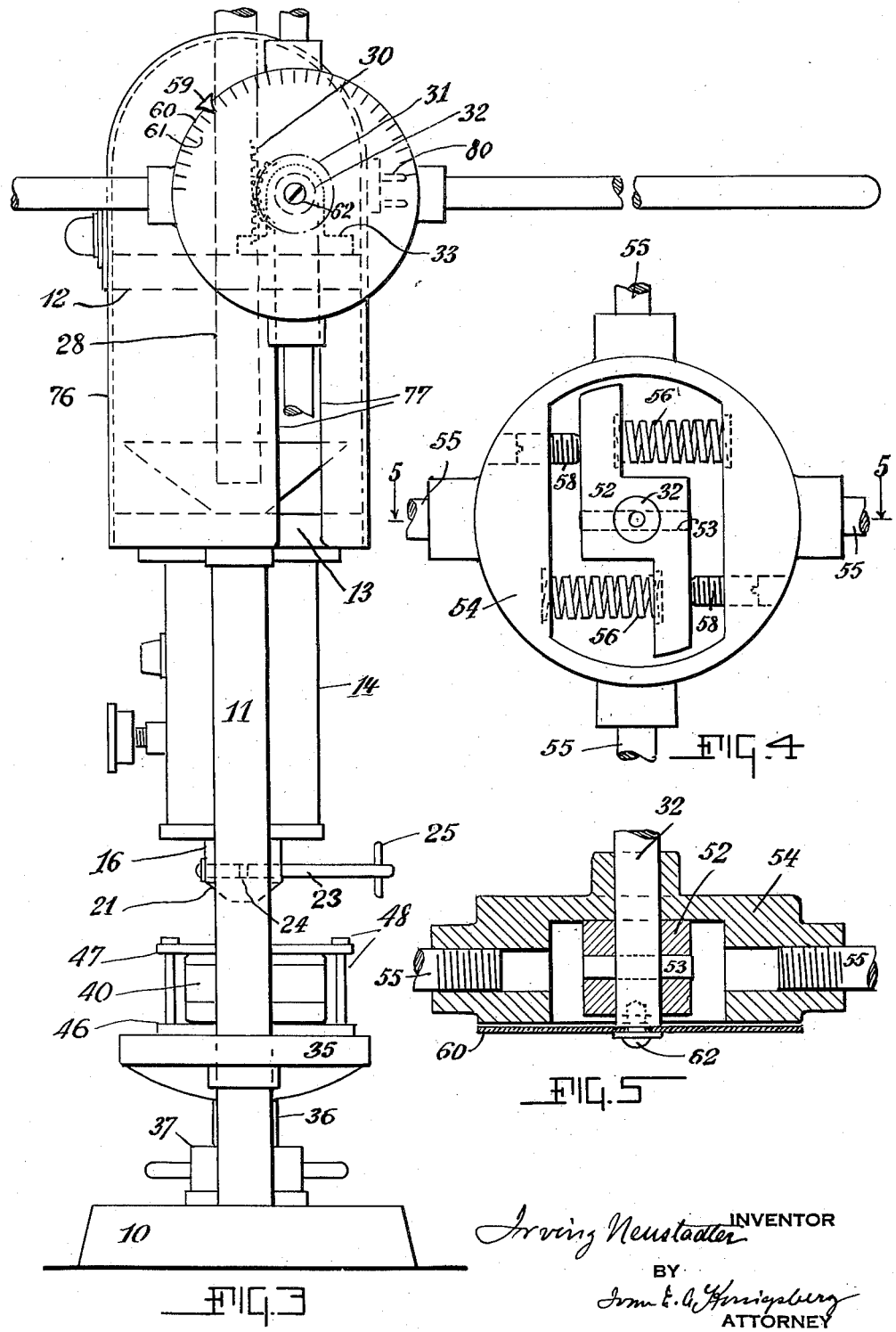

Patented Nov. 6, 1951

2,573,805

UNITED STATES PATENT OFFICE 2,573,805

MACHINE FOR MAKING DENTURES

Irving Neustadter, Brooklyn, N. Y.

Application November 16, 1949, Serial No. 127,659

1 Claim. (Cl. 18—5.7)

The object of this invention is to provide a new and improved machine for making dentures. The machine is of the injector type such as is disclosed in my pending application filed July 23, 1949, Serial Number 106,450. The invention is embodied in a machine which includes a heating unit for receiving and plasticizing the plastic granular material from which dentures are made. It also includes mechanisms for injecting the material into a dental mold and is provided with certain novel features and improvements with respect to the injecting mechanism, pressure controlling means and a valve for preventing premature discharge of the plasticized material and preventing material from oozing out of the mold and back into the machine when the injection pressure is removed. Other objects include means for generally improving the construction and appearance of the machine for more efficient operation.

In the accompanying drawings:

Fig. 3 is a view of the operating side of the machine looking in the direction of arrow 3 in Fig. 1.

Fig. 4 is a face view of the pressure controlling means or torque relief mechanism.

Fig. 5 is a sectional view on the line 5—5 of Fig. 4.

Figures 1, 2:
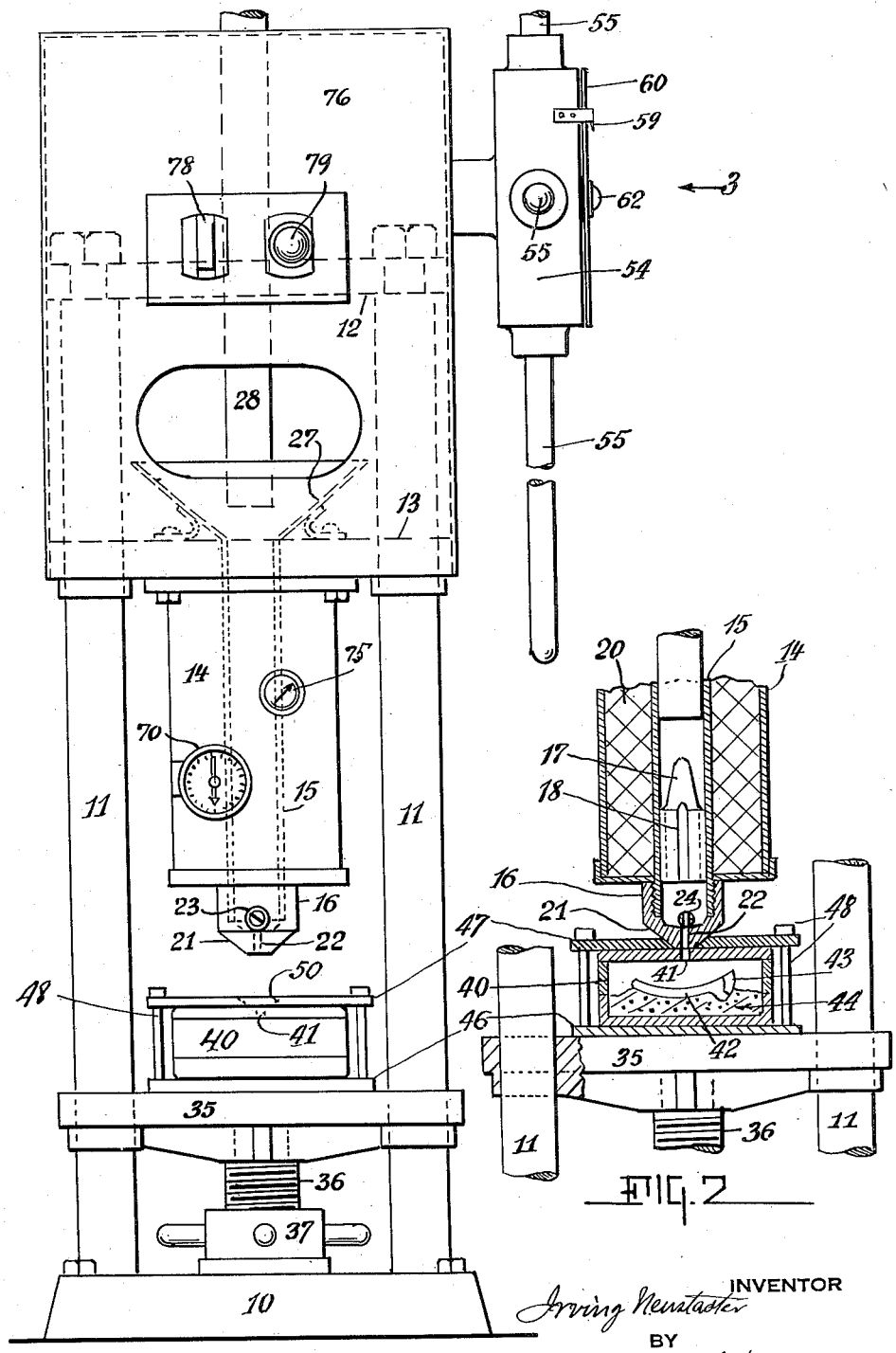
Fig. 1 is a front view of the machine with a dental flask placed in position to be filled.
Fig. 2 is a central sectional view of parts of the heating unit and shows a mold in section about to be filled with denture material.

The machine has a base 10 adapted to be mounted upon a table or bench. The base supports two upright rods 11, 11 which carry two fixed plates 12 and 13. The latter supports a dental material receiving and heating unit which is enclosed within a casing 14. The unit has a feed tube 15 open at the top in the plate 13. At the bottom, Fig. 2, the tube carries a nozzle 16 and a material dividing plug 17 having grooved channels 18. The tube is surrounded by an electrical heating element 20, shown conventionally, within the casing 14. The nozzle 16 has a cone shaped outlet 21 with an aperture 22. The nozzle carries a valve 23 with an opening 24 in alinement with the nozzle opening 22. The valve extends across the nozzle and has an operating handle 25, Fig. 3.

Granular plastic material is poured into the feed tube 15 through a funnel 27 mounted on the plate 13. The material is injected into the dental mold by a plunger 28 which moves within the tube 15. The plunger, Fig. 3, is provided with a rack 30 in mesh with an actuating gear 31 on an operating shaft 32 supported in bearings 33 on the plate 12.

At the bottom of the machine there is a vertically movable flask carrying platform 35 supported on the threaded shaft 36. The platform slides vertically on the rods 11, see Fig. 2. A nut 37 is mounted on the base 10 in threaded engagement with the shaft. When the nut is rotated right or left, the platform 35 is raised or lowered as the case may be.

The machine is designed to operate with a standard dental flask as now generally used in the art. With this object in view this invention includes a separate flask holder unit. As seen in Figs. 1 and 2 the standard flask is marked 40 and has the usual inlet 41 in the top plate of the flask. By way of illustration there is shown in Fig. 2 a dental mold 42 which is to be filled to form a denture including teeth 43. The usual plaster material is indicated at 44. The flask holder unit consists of a bottom plate 46 below the flask and a top plate 47 on top of the flask. When the mold has been prepared the flask is assembled in known manner and thereafter the flask is clamped between the plates 46 and 47 by bolts and nuts 48. The top plate has a conical inlet 50 to receive the conical nozzle outlet 21.

In order to control and regulate the injecting and compression pressure of the plunger 28 the following mechanism is provided. As seen in Figs. 3–5 the operating shaft 32 has pinned thereto a block 52 by a pin 53. Surrounding the block there is a cylindrical handle housing 54 which carries four operating hand arms 55. The block 52 and the housing 54 are connected in driving flexible operative relation by two expansion springs 56. Set screws as at 58 are provided for adjusting the original spring pressure and for assembling purposes. The housing 54 carries a pointer 59 and a scale disk 60 is secured to the shaft 32 to turn therewith by means of a screw 61. The disk carries a scale 62.

The purpose and function of the special pressure controlling and torque relief unit shown in Figs. 4 and 5 will best be understood in connection with a description of the entire operation of casting a denture. Let it be assumed that the feeding tube 15 is filled with plastic material which has been melted by the heating unit which is usually kept turned on in the laboratory where a denture is made. Let it further be assumed that the dental mold has been made in the flask 40 and the latter clamped in the holder. The flask unit is then placed upon the platform 35 and the latter raised against the nozzle 16 with the conical nozzle outlet 21 seated tightly in the conical inlet 50 in the top plate 47. Before the plastic material is poured into the feeding tube 15 the valve 23 is closed so as to prevent leakage of the melted plastic into the mold. Such leakage in the form of a gob or drop would quickly cool by contact with the flask and harden to prematurely clog the inlets 22 and 41.

When the operator is ready to fill the mold he opens the valve 23 and takes hold of the arms 55 to rotate the operating shaft 32 to lower the plunger into the feed tube and force the plastic into the mold, the material flowing through the tube 15, down through the grooves 18 and the apertures 22 and 41 into the mold. When the mold is filled a resistance to further filling or movement of the plunger is felt by the operator in his hands as he turns the arms 55. He then observes the positions of the pointer 59 and the scale 61 which at this time indicate that the mold has been filled but not under compression pressure. During this feeding movement of the plunger the block 52 and the housing 54 have rotated together as if a single element. As the operator now continues to operate, a back pressure from the mold resists the rotating movement of the block 52. This resistance will be overcome in an increasing degree by the movement of housing 54 which will compress the springs 56 and thus communicate the continued manual movement to the block 52 and the shaft 32.

The operator will know through experience and instruction how much further he has to turn the housing until the plunger has been lowered to such an extent that a predetermined compression pressure has been reached or exerted upon the material in the mold. Such predetermined compression pressure is noted by observing the pointer and the scale, and the operator therefore continues the rotating movement until these indicators inform him that the operation is completed. He then turns the arms backwards, to release the pressure upon the plunger and thereafter the springs 56 automatically restore the block 52 and the housing 54 to normal positions as shown in Fig. 4. The valve 23 is at all times operable independently of any other part of the machine, for example for cleaning the nozzle and the like.

As soon as the predetermined compression pressure is reached and before the plunger is raised from the mold, the valve 23 is closed to prevent the material from oozing up out of the mold and back into the nozzle and feed tube. The opening 50 in the flask holder will quickly be closed by the hardening of the material therein so after a few minutes wait the flask holder and flask may be removed from the machine for final cooling and setting of the material, the platform 35 being lowered for this purpose. Thus the operator need not wait for the cooling of the mold as would be the case were the flask holder not provided. There will of course be as many flask holder units provided as the business requires.

In order to control and observe the orderly operation of the machine, the latter is provided with a thermometer 70 and a thermostat knob 75. The upper portion of the parts of the machine is enclosed by an ornamental housing 76 which has an opening in the top for the passage of the plunger. The housing fits over the plates 12 and 13, and has a slot as at 77, Fig. 3, so it can be lowered and raised over the shaft 32. The housing also carries a switch 78 and a light signal 79 in front. On the back there is the usual plug in terminal 80. The connecting wires are not shown. They are placed within the machine as may be most convenient and practical.

The operation of injection and compressing the plastic material within the mold is one continuous operation. The relative positions of the pointer 59 and the scale 61 are so designed and placed that the commencement and finish of the compression movement are definitely indicated to the operator and the relief torque unit enables the operation to be carried out automatically with a calculated increase in pressure.

It will be seen from Figs. 1 and 3 that the machine is of novel pleasing design and construction. All the parts which must be observed during the operation are placed in front of the machine and ample space is provided for the placing and removal of the flask units. The valve 23 may extend in any direction from the nozzle as may be most convenient for reaching the handle. The mechanism for cushioning or gradually resisting the compression movement of the plunger is wholly enclosed. Only one pointer 59 is shown. There may be more than one. For example, four pointers may be used so that there will always be one pointer to be observed between two of the arms 55. The scale will then of course be extended to read in four quarter sections to match the pointers. Such additions or modifications are not illustrated, they being obvious multiplications of existing elements. There are no springs in the machine other than the springs 56 for gradually and automatically resisting and controlling the compression pressure and provide a cushion means therefor. It is an important feature of the invention that the machine operates with standard dental molds or flasks.

I claim:

In a dental machine of the character described, a movable plunger for injecting melted denture material from said machine into a dental mold and for compressing said material in the mold to form a denture, said plunger, having an injection and a subsequent compression period of movement, mechanism for operating the plunger as aforesaid, said mechanism comprising an operating shaft, gearing means interposed between and operatively connected to said shaft and plunger for moving the latter when said shaft is rotated, a block member secured to the shaft, a housing enclosing said block member, springs interposed between the block member and the housing for yieldingly communicating a rotary movement of said housing to the block member, shaft and plunger, handles on the housing for rotating the same and means for automatically indicating the beginning of the compression period of the plunger during the rotation of the said housing, said last mentioned automatic means consisting of a fixed dial and an indicator rotatably mounted thereon.

IRVING NEUSTADTER.

REFERENCES CITED

The following references are of record in the file of this patent:

UNITED STATES PATENTS

| Number | Name | Date |
| --- | --- | --- |
| 133,229 | Hyatt et al. | Nov. 19, 1872 |
| 1,674,387 | Campbell | June 19, 1928 |
| 1,724,691 | Andresen | Aug. 13, 1929 |
| 2,035,801 | Gastrow | Mar. 31, 1936 |
| 2,279,952 | Pryor | Apr. 14, 1942 |
| 2,359,152 | Pryor et al. | Sept. 26, 1944 |

FOREIGN PATENTS

| Number | Country | Date |
| --- | --- | --- |
| 688,449 | France | May 12, 1930 |
| 350,810 | Great Britain | June 18, 1931 |